United States Patent Office
3,443,430
Patented May 13, 1969

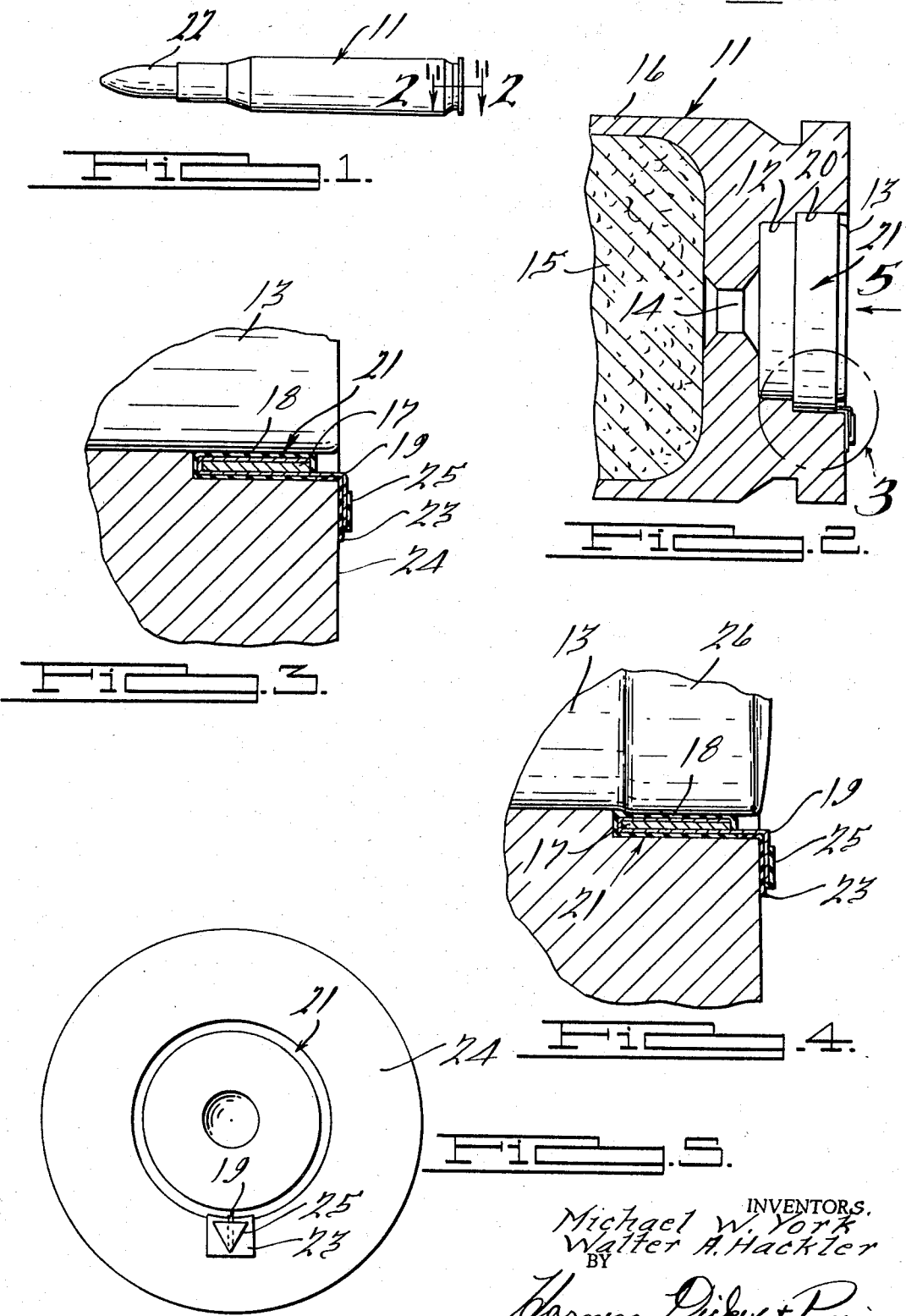

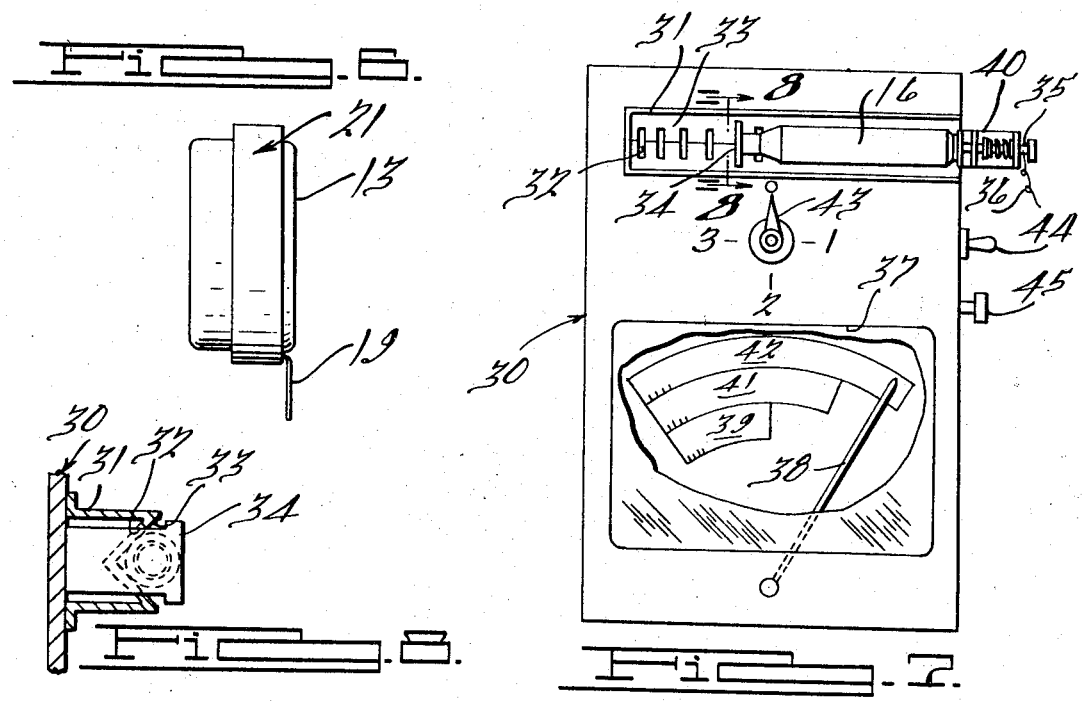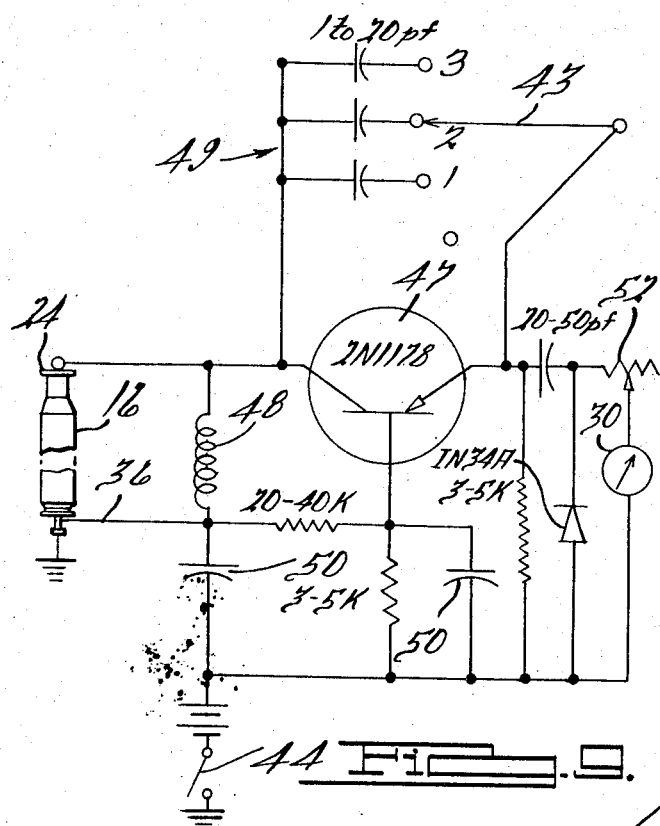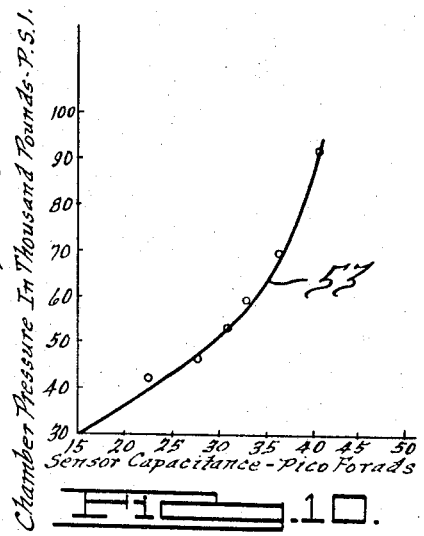

3,443,430
CARTRIDGE FOR MEASURING CHAMBER PRESSURE
Michael W. York, Ypsilanti, Mich. (1200 S. Arlington Ridge Road, Apt. 507, Arlington, Va. 22202), and Walter A. Hackler, Ann Arbor, Mich.; said Hackler assignor to said York
Filed Oct. 5, 1966, Ser. No. 584,485
Int. Cl. G01l 5/14
U.S. Cl. 73—167                    10 Claims

ABSTRACT OF THE DISCLOSURE

A system for measuring pressures in a gun is presented that incorporates a pressure sensitive capacitance element that is mounted on a cartridge casing so that it is compressed by pressures built up within the cartridge casing when the gun is fired. This capacitance element is deformed after it is exposed to pressures generated in the gun barrel when the gun is fired. The capacitance of this deformed pressure sensitive element can then be measured by a suitable measuring instrument. Through proper calibration, this instrument can give a reading in force per unit area, such as pounds per square inch, that the casing was exposed to upon firing.

---

This invention relates to pressure measuring devices and particularly to a portable device for measuring the breach pressure of a gun.

The device embodies a system which has been developed to detect and record the maximum breach pressure produced by the firing of a cartridge in small arms or other weapons that utilizes a cartridge case and primer. The system consists of a sensing element employed in combination with measuring unit. The sensing element is contained in the cartridge case and senses the maximum breach pressure. After the cartridge has been fired, the case is removed from the weapon and the sensing element is measured by a measuring unit which indicates the maximum pressure that was built up within the weapon when the cartridge was fired. The sensing element is contained within the cartridge case and functions independent of other elements or devices when the weapon is fired. The system is capable of measuring the breach pressure in any small arm or similar weapon or pressurized device that employs a case with a cap without the necessity of modifying the weapon or device in any manner. Since no modification of the weapon or laboratory equipment is required for the pressure measurement, the new system is believed to offer substantial advantage over the present known systems that require modification of the weapon or special equipment for registering the maximum pressure developed during the firing.

Accordingly, the main objects of the invention are: to provide a breach pressure measuring device which requires no modification of the weapon for sensing the maximum pressure developed in the barrel breach; to provide a condensorlike sensing element on a cartridge which is deformed by the pressure in the breach of a weapon when the cartridge is fired; to provide a sensor by insulating a strip of deformable metal of a size to be received by an aperture about the cap on the end of the cartridge case which is deformed by the expansion of the cap when the cartridge is fired; to provide a contact on the rim of the cartridge from the sensor by which contact is made with a recording meter of the capacitance measuring type which measure the capacity of the compressed sensor in force per unit area to directly indicate the maximum pressure developed in the breach when the cartridge was fired, and in general, to provide a breach pressure measuring device which is simple in construction, positive in operation and economical of manufacture.

Other objects and features of novelty of the invention will be specifically pointed out or will become apparent when referring, for a better understanding, to the following description taken in conjunction with the accompanying drawings, wherein:

FIGURE 1 is a view of a cartridge with a sensor therein embodying features of the present invention;

FIG. 2 is an enlarged broken sectional view of the structure illustrated in FIG. 1, taken on the line 2—2 thereof;

FIG. 3 is an enlarged broken sectional view of the structure illustrated in FIG. 2, taken within the circle 3 thereof;

FIG. 4 is a view of the structure illustrated in FIG. 3 after the cartridge was fired;

FIG. 5 is a right hand end view of the structure illustrated in FIG. 2, after the cartridge was fired;

FIG. 6 is a view of a cap with a sensor attached thereto;

FIG. 7 is a plan view of a recording unit with a case therein being tested;

FIG 8 is an enlarged broken sectional view of the structure illustrated in FIG. 7, taken on the line 8—8 thereof;

FIG. 9 is a view of a circuit which may be employed within the recording device of FIG. 7, and FIG. 10 is a view of a graph showing a breach pressure versus capacitance curve.

Referring more particularly to FIGS. 1 to 5 inclusive, a cartridge 11 is illustrated which embodies a particular form of the present invention. As illustrated in FIG. 2, the end of the cartridge contains a pocket 12 for the receipt of the cap 13 which has fulminate or like material therein which when struck by a firing pin ignites to produce a flame through the aperture 14 to ignite the propellent 15. The pressure buildup within the case 16 as the projectile 22 is forced through the bore will be equal in all directions and will be applied to the interior of the cap 13, and be the same as that within the cartridge case and the breach end of the barrel. An insulated sensor 21 is applied to the cartridge which is deformed by the built up pressure, the extent of which is measurable by the amount of compression of the sensor material. The sensor may take any shape and be applied in a manner to be affected by the pressure buildup within the case and breach end.

In the present arrangement, the sensor 21 is applied about the cap 13 within a shouldered recess 20 formed by counterboring the pocket 12 at this case end. In the particular cartridge 11 herein illustrated, the cap 13 is approximately 0.210 inch in diameter and the counterbore 20 is approximately 0.0020 of an inch larger in diameter than the cap, extending to a depth of approximately 0.045 to 0.065 of an inch. When the cap 13 is inserted in the pocket 12 the counterbore 20 provides an annular space thereabout in which the sensor 21 is inserted, as illustrated in the figures. The particular sensor 21 herein illustrated is made from a thin strip of metal 17 and a thin piece of nonconductive strip material 18 such as adhesive tape known as Scotch Magic Mending Tape. The metal strip 17 employed in the sensor 21 is soft, preferably made of lead aproximately 0.005 inch thick which has a width of approximately 0.040 inch and a length of approximately 0.625 inch. An uninsulated piece of copper wire 19 of approximately 40 gauge is placed about the center of the lead strip and secured by the insulating strip 18 when folded upwardly over the sides of the lead strip 17. The edges of the strip 18 are then folded over the top edge and ends of the lead strip to thereby be completely insulated with the wire extending therefrom. The sensor 21 has a dimension of aproximately 0.045 of an inch in width and 0.660 of an inch in length with about 1/16 inch of the copper wire extending from a midpoint thereof.

Prior to the installation of the sensor, the cap 13 is seated in the primer pocket 12. A considerable number of tests have shown that the "magnum type piston cap" provided good sensitivity and the most accurate and wider range of pressure measurements. After seating the cap in the pocket 12 the flat sensor 21 is rolled about a cylinderical rod which has roughly the same diameter as the cap. The rolled sensor is then slid off of the rod and the edge engaged by the fold of the insulating tap is first inserted in the annular counterbore 20 between the cap and the cartridge case. This assembly is clearly illustrated in FIG. 2.

A thin piece of insulating material 23 is secured to the end face 24 of the cartridge in engagement with the insulating strip 18 at the location of the wire 19. The wire is then bent over to rest upon the material 23 and secured in position by a conducting tab 25 which is insulated from the cartridge case. The conducting tab 25 forms one of the contacts by which the capacitance of the sensor 21 is measured after compression to provide an indication of the pressure developed within the case when the shell was fired.

This relationship is clearly illustrated in FIG. 3 before firing and in FIG. 4 after firing. In FIG. 4, it will be noted that the wall of the cap 13 has been expanded in the area 26 to compress the lead strip 17 and move the walls of the insulating strip 18 closer together to thereby provide a capacitance to the sensor which will vary with the amount of pressure developed within the cartridge when fired. It is only necessary to measure the capacitance of the sensor 21 after firing to obtain an indication of the pressure developed which is read directly from a meter. It is to be understood that the invention is not limited to the use of an annular sensor or an annular recess about the cap. The sensor could be applied to the cartridge in other manners, such as having a sensor made as a washer and applied to the end face 25 of the cartridge, the central opening permitting the firing pin to strike the cap. The reactive force to the firing will compress the sensor against the breach block of the gun or like weapon.

In FIG. 6, a further form of the invention is illustrated that wherein the sensor 21 is applied to the cap 13 to form a unit construction. In this arrangement the sensor may be made, as indicated above, having an insulating strip 18 disposed about a lead strip 17 which is adhered to the outer wall of the cap 13. Preferably, an epoxy or other plastic material may be coated on the cap. The epoxy is applied over the lead strip and is adhered to the epoxy on the cap in fixed relation thereto and entirely insulated from the cap with an insulating coating thereabout. The wire 19 may be applied to the lead strip by either winding it thereabout or securing an end in an aperture therein. With this arrangement, when the cap is applied to the pocket, the sensor will move into the shouldered recess 20 at the end of the cartridge and the wire 19 in insulated therefrom by the strip 23 and engaged by the tab 25 in the manner pointed out hereinabove.

In FIGS. 7, 8, 9 and 10, a meter is shown which directly reads the maximum pressure which was built up within the cartridge, cap and breach end of the gun. Many capacity measuring devices known in the art to be suitable can be employed along with a conversion table which will provide the readings in pounds per square inch when checking the capacity of the sensor 21 after the cartridge was fired. In the present arrangement a simple circuit is employed for the purpose of illustration at the circuit could take other forms for registering the capacitance of the sensor. For the purpose of illustration, the case 30 has an M-shape stamping 31 provided with slots 32 in a V-portion 33 thereof in one of which a partition element 34 is inserted to conform to the length of the case 16 of the fired cartridge. A spring pressed plunger 35 is mounted in an insulated bracket 40 for contacting the tab 25 on the end of the cartridge case, the plunger having a conductor 36 fixedly secured thereto. The meter has a window 37 through which an indicating hand 38 and three scales 39, 41 and 42 are visible. A selecting knob 43 may be turned to the positions 1, 2 and 3 shown on the face of the case and conforming to the three scales. A switch 44 has an "On and Off" position in the circuit and a knob 45 is adjustable for initially calibrating the circuit. Basically, the capacitance measuring device is a tank circuit oscillator in which resonance is not achieved. Insertion of an unknown capacitance (the sensor 21) brings the tank nearer to resonance as indicated by measuring the emitter current of the oscillator 47. The emitter current is in direct proportion to the unknown capacitance and can be calibrated so that the device is a direct reading capacitance meter. These readings are converted to pounds per square inch pressure so that a direct reading is obtained from the scales 39, 41 and 42. The range of the device may be varied by a change in the number of turns in the tank coil 48 and by selecting one of the set of capacitors 49 which may range from 1 to 20 picofarads which is to be connected across the emitter and collector 47. The sensitivity of the device is varied by changing the capacitors 50 from 0.05 to 0.15 picofarad in the base section of the circuit. The 1K potentiometer 52 is used to calibrate the 0–100 millimeter with a known capacitor inserted into the tank circuit. Measurement of unknown capacitor is performed by inserting it into the tank circuit and turning the "On-Off" switch 44 to "On" position. The meter then indicates the unknown capacitance on the scale selected by the knob 43. When employing the present system, the modified cartridge cases with the sensors in place are loaded with selected amounts of propellent and closed with a suitable projectile. The completed cartridges can be loaded and fired in a weapon in the same manner as an ordinary cartridge. Since the sensor is located in the counterbore section 20 of the cap pocket 12 between the cartridge case and the cap, the expanded cap reduces the distance between the cap and the cartridge case and compresses the sensor to increase its area and reduce its thickness. Both of these effects result in an increase in capacitance of the sensor and cartridge combinations with increasing pressure. Both of these effects are understandable since the capacitance of a parallel plate capacitor is basically given by the following:

$$C \propto A/d$$

Where C is the capacitance, A is the area of the plate of the capacitor and $d$ the distance between the insulating plates or walls formed by the strip 18. With a pressure sensor, which is roughly approximately by a parallel plate capacitor in which A is capable of increasing and $d$ is capable of decreasing, the combined effects of the change in A or $d$ or both in some pressure ranges result in the capacitance versus pressure curve 53 of FIG. 10. It will be noted in the curve that as the sensor is compressed more and more its capacitance in picofarads increased and is converted into pounds per square inch on the abscissa of the curve 53. As a result, when more and more pressure is applied to the sensor to compress it more and more, the pounds pressure per square inch exerted to produce the compression can be read directly from the curve.

After a cartridge has been fired, the effects of the pressure in the cartridge have resulted in a permanent deformation of the cap 13 and the dimensions of the sensor have been changed with a corresponding change in its capacitance. Since these changes are permanent, the cartridge cases can be removed from the weapon and then measured at any convenient time or as many times as desired. In the arrangement the cartridge case 16 is one terminal and the wire 19 from the sensor and tab 25 is the other terminal. After the sensor has been measured, the case with the sensor can be stored and remeasured at any future date or the case can be reprimed and reprocessed with a new sensor and then be used in measuring the maximum chamber pressure in another firing. The circuit has not been traced in detail as it is of the exemplary type which may be varied by one skilled in the art to suit any condition. Since one skilled in the art can readily understand the circuit or a modification thereof, it is shown with sufficient clarity to permit such a person to have it reproduced.

After a cartridge has been equipped with a sensor, it may be fired in a gun which has been modified to give the pressure in pounds/square inch. Knowing the maximum pressure developed in the cartridge the measurement of the capacitance of the deformed sensor provides a reading for the meter scale. The firing of several cartridges with varying charges in this manner produces the curve 53 shown in FIG. 10. This gives pressure readings for cartridges with the sensors of the present invention when fired in standard weapons.

What is claimed is:

1. A pressure measuring device for a gun comprising a cartridge case and a permanently deformable capacitance element mounted on said cartridge case at a point where it will be compressed when said gun is fired.
2. A pressure measuring device as recited in claim 1, wherein said permanently deformable capacitance element comprises a metal member covered by an insulating material.
3. A pressure measuring device as recited in claim 2, wherein said metal member comprises lead.
4. A pressure measuring device as recited in claim 2, wherein, said insulating material is in strip form and is folded about said metal member.
5. A pressure measuring device as recited in claim 2, wherein a conductor extends from said metal member and is insulated from said cartridge case.
6. A pressure measuring device as recited in claim 1, wherein said permanently deformable capacitance element comprises a soft material strip.
7. A pressure measuring device as recited in claim 1, wherein said cartridge case has a cap and said permanently deformable capacitance element is of annular shape disposed between said cap and said cartridge case.
8. A pressure measuring device as recited in claim 7, wherein said permanently deformable capacitance element comprises a compressible metal portion from which a conductor extends, and means for insulating said metal portion and said conductor from said cartridge case.
9. A pressure measuring device as recited in claim 1, including a capacitance measuring instrument.
10. A process for measuring pressures in a gun comprising the steps of:
    (1) Mounting a permanently deformable capacitance pressure sensing element on a cartridge case that is to be inserted into said gun;
    (2) Exposing said permanently deformable capacitance pressure sensing element to the pressures developed within said gun when said gun is fired; and
    (3) Measuring, after deformation, the change in capacitance of said permanently deformable capacitance pressure sensing element caused by said pressures to determine the pressures developed within said gun when said gun was fired.

References Cited
UNITED STATES PATENTS

| | | |
|---|---|---|
| 2,755,796 | 7/1956 | Boucke. |
| 3,014,368 | 12/1961 | Musser et al. _____ 73—167 |
| 3,122,919 | 3/1964 | Kendrick _____ 73—167 |
| 3,263,489 | 8/1966 | Schimmel et al. ____ 73—167 XR |
| 3,345,876 | 10/1967 | Smith _____ 73—167 XR |

LOUIS R. PRINCE, *Primary Examiner.*

JEFFREY NOLTON, *Assistant Examiner.*

U.S. Cl. X.R.

73—398